United States Patent [19]
Lewis

[11] Patent Number: 5,797,346
[45] Date of Patent: Aug. 25, 1998

[54] ODOR FREE LITTER SYSTEM

[76] Inventor: Michael R. Lewis, 16520 S. Tamiami Trail #18-281, Fort Myers, Fla. 33908

[21] Appl. No.: 869,207

[22] Filed: Jun. 4, 1997

Related U.S. Application Data

[63] Continuation-in-part of Ser. No. 673,555, Jul. 1, 1996, abandoned.

[51] Int. Cl.⁶ ........................................ A01K 1/035
[52] U.S. Cl. ............................................... 119/166
[58] Field of Search .......................... 119/166, 165, 119/167

[56] References Cited

U.S. PATENT DOCUMENTS

| | | | |
|---|---|---|---|
| 4,217,857 | 8/1980 | Geddie | 119/166 |
| 4,505,226 | 3/1985 | Carlson | 119/166 |
| 5,012,765 | 5/1991 | Naso et al. | 119/166 |
| 5,325,815 | 7/1994 | Gumpesberger | 119/166 |
| 5,392,733 | 2/1995 | Tominaga | 119/166 |
| 5,507,248 | 4/1996 | Gabbert | 119/166 |
| 5,598,811 | 2/1997 | Merchant | 119/166 |

*Primary Examiner*—Terry Lee Melius
*Assistant Examiner*—Yvonne R. Abbott

[57] ABSTRACT

An improved sifting type pet waste receptacle, commonly known as a litter box, for separating both solid and liquid pet waste from clumping type litter material. It includes at least two solid bottomed pans with a vertical wall portion and an open top, plus at least one sifting device having a perforated bottom portion with a vertical wall portion and an open top. The bottom portion of the solid bottomed pans also include a plurality of projections to prevent clogging of the perforations in the sifting device. Also included is a spill rim to help contain litter material which may be thrown out during digging and/or covering by the pet, with a disposal door added to the vertical wall portion to prevent pet waste from being spilled during disposal.

3 Claims, 4 Drawing Sheets

ODOR FREE LITTER SYSTEM

This application is a continuation-in-part of application Ser. No. 08/673,555, filed on Jul. 1, 1996, now abandoned.

REFERENCES CITED
4,217,857 8/1980 Geddie 119/166
5,598,811 2/1997 Merchant 119/166
5,507,248 4/1996 Gabbert 119/166

BACKGROUND OF THE INVENTION

1. Field of the Invention

The present invention relates to the several sifting type litter boxes, which are designed to separate pet waste, whether solid, or both solid and liquid from a clumping type litter material.

2. Brief Description of Prior Art

A device commonly known as a litter box has been used as indoor plumbing, or toilet if you will, for cats over the last several years. In more recent years several new types of litter boxes, most having some type of sifting device for separating pet waste from the litter material, have been introduced. This provides several benefits to the pet owner which include; improved bacteria/odor control, added convenience of maintenance, and cost savings afforded by the ability to reduce waste of unsoiled litter material. It is apparent that the devices which solve the old problems, have created new problems.

U.S. Pat. No. 4,217,857 issued to Geddie, discloses one such device, which nestably stacks a plurality of solid receiving pans, with a sifting tray having a perforated bottom portion which performs the actual separating. While Geddie's device was not originally designed for clumping type litter, it is obvious that the use of clumping litter is the only way liquid waste can be removed rather than dried. As the pet uses the device, waste is deposited onto the clumping litter material, and is then buried by the pet. The first problem arises when the liquid waste agglomerates the litter material in the bottom which is in contact with the sifting tray. The plurality of openings which are to perform the sifting become clogged with agglomerated litter material. Due to the substantially large area of the bottom portion, sifting can still take place. The problem arises when the pet owner must clean the sifting tray before replacing it for future use. One of the benefits was supposed to be the added convenience of no more scooping. If the scooping is now replaced by mechanical working, which is no simple chore given the plurality of openings in the sifting tray, this negates any time saved by the sifting tray. The second problem arises when the waste must be disposed of into a trash receptacle or water toilet. Given the substantial size of the litter box unit, spillage occurs in most cases, again negating any convenience gained by the sifting tray. Yet another problem is evident in the fact that substantially large portions of agglomerated litter material contact the receiving pan directly below through the openings in the sifting tray, which must also be mechanically worked for removal. Failure to perform any of these additional chores results in substantially reduced bacteria and odor control. Additionally, any contaminated litter material remaining in the box would be broken up and distributed throughout the litter material, thus requiring the entire contents to be thrown out.

U.S. Pat. No. 5,598,811 issued to Merchant, is substantially similar to Geddie's invention, however one spillage problem has been solved through the addition of a lid with a spout for pouring the waste into the waste receptacle, or into another litter box receptacle What Merchant has overlooked in the concern for containing bacteria, which may become airborne while pouring the waste into a trash receptacle, is the fact that the agglomerated litter material clogs the openings of the sifting tray, which must be cleaned, and entails removing the spouted lid to access the sifting tray in order to unclog the openings. Additionally, the granules of clumping type litter material are much smaller and lighter, and are thrown out of the box much more readily and in greater quantity than conventional litter material which is heavier. So if the pet owner desires to use what is commonly known as a spill rim, another step is added to the chore of sifting which entails removing the spill rim, placing the lid with spout over the box, and then the reverse when the chore is completed.

U.S. Pat. No. 5,507,248 issued to Gabbert, details a non-clogging feature of additional perforations about two inches up the side walls of the sifting tray. In some extreme cases where multiple animals may use the same box this could be a problem, but this problem is avoided with more frequent cleaning. In the description used by prior art, the fact that different litter materials form various degrees of hardness, and that some may break apart where others do not, is a matter of selection on the consumer's part. Regardless of the non-clogging feature, the sifting tray will still break apart softer clumping materials. What still exists is the clogging problem of the perforations themselves, which must be mechanically worked in order to be cleaned. As other prior art mentioned, much of the convenience is negated by the additional cleaning required. Yet another problem that still exists is the spillage which occurs when waste is poured into a trash receptacle or water toilet due to the substantial size of the litter box. The spillage must then be cleaned up by the pet owner, again negating the convenience provided by the sifting tray. Another spilling problem arises when the sifting tray is lifted out of the receiving pan. Litter passing through the holes in the bottom would be caught by the pan below, litter passing through the holes in the side would move in a more horizontal direction, thus missing the pan below and ending up on the floor.

SUMMARY OF THE INVENTION

It is the object of this invention to provide an improved sifting type litter box for separating pet waste from unsoiled clumping litter material. Another object of this invention is to provide added convenience over products which may already claim the same. It is another object of this invention to prevent spillage of pet waste and/or litter material while it is being disposed of into a waste receptacle. It is still another object of this invention to prevent clogging of the openings or perforations by agglomerated litter material. It is still another object of this invention is to provide better bacteria and odor control, as well as extending the useful life of the litter material, through the more complete separation of waste from litter material, thus providing greater economy to the pet owner by using far less clumping litter material, which is much more expensive than conventional litter materials.

These and other objects of the invention are achieved by a sifting type litter box having three nested receptacles. Two of the receptacles having a plurality of projections, arranged such that they engage the openings or perforations in the in the third receptacle to be known as the sifting tray hereafter. Additionally, a removable spill rim having a built in disposal door, lockingly engages the integrally formed lip rim of the sifting tray to form a substantially tight seal. The disposal door is a portion of the vertical wall portion of the spill rim and is hinged on one side, and lockingly engages the lip or rim of the sifting tray on the other side. The disposal door serves to guide the pet waste into the preferred waste receptacle, whether being a smaller trash can or water toilet, without spilling either pet waste or litter material.

DETAILED DESCRIPTION

Figure 1:
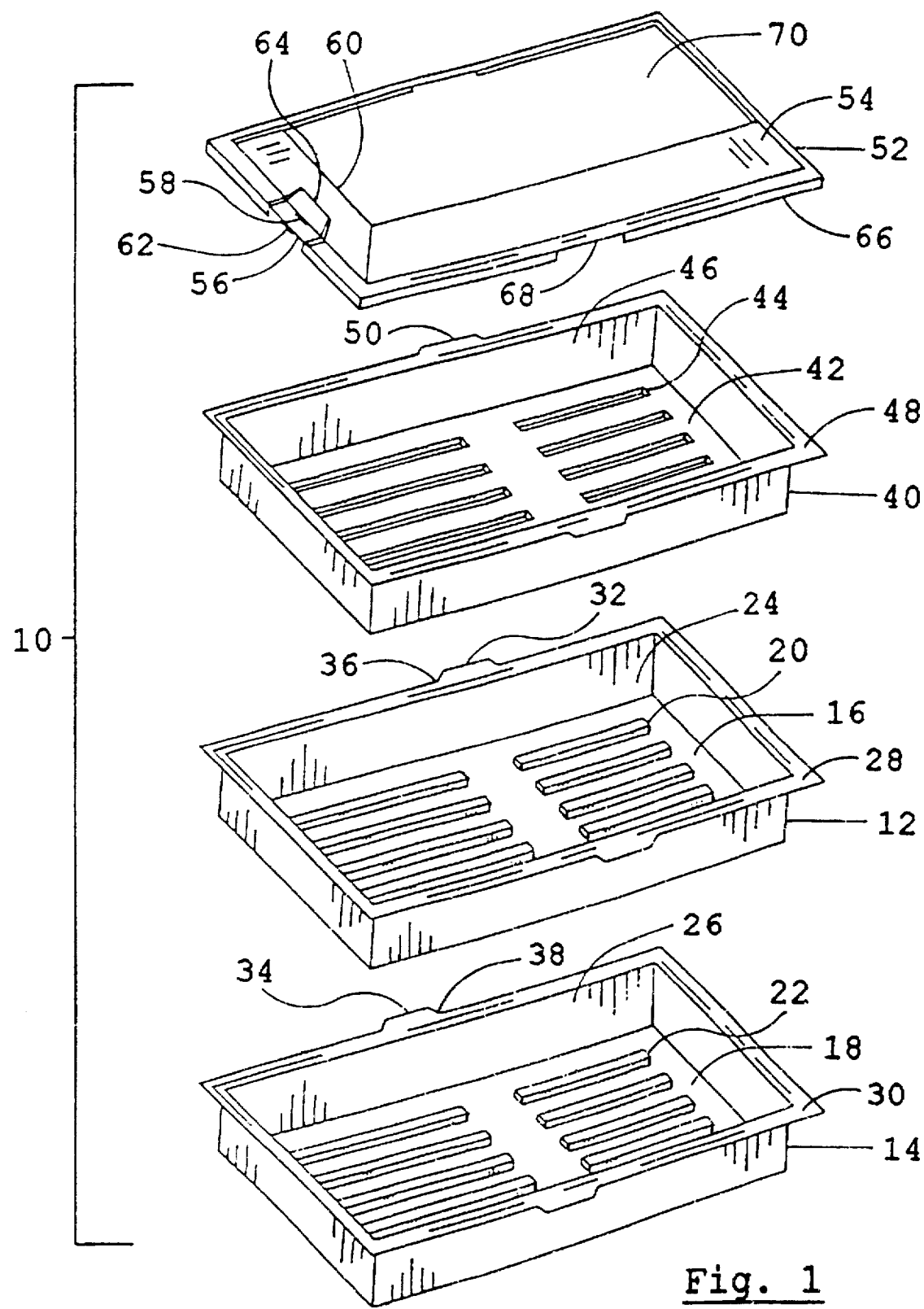
FIG. 1 shows a perspective view of the preferred embodiment of the Odor Free Litter System.

Referring to FIG. 1, a perspective view of the preferred embodiment of the invention designated therein by the numeral 10, is shown. The invention 10 is designed for use with clumping cat litter only, so that both liquid and solid pet waste may be completely removed on a daily, or at least very frequent basis, thus eliminating odor and bacteria while extending the useful life of the cat litter material and providing far greater convenience than similarly designed inventions.

The invention 10, has two nestably interchangeable receiving pans 12 and 14, both comprising a solid bottom portion 16 and 18, both having a plurality of projections 20 and 22, on said bottom portion 16 and 18, respectively. The vertical wall portion 24 and 26, of the receiving pans 12 and 14, have an integrally formed rim 28 and 30, which have integrally formed handles 32 and 34, which mutually oppose each other for gripping the componants when lifting one out of the other during the sifting procedure. Said handles 32 and 34, are positioned at a distance of one half of the total length of the handles from the center of the length of the wall portion 24 and 26, in order to provide space for gripping any one of the componants. Further, when one of the receiving pans 12, is turned 180 degrees and nestably placed inside the other, the edge of the handle nearest the center 36, of the wall portion 24, will align with the edge of the handle nearest the center 38, of the wall portion 26, of the remaining receiving pan 14. Because each of the receiving pans 12 and 14, are substantially identical, this positioning of the handles previously described, is also interchangeable or reversible, making it insignificant which one of the receiving pans is turned.

Figure 3:
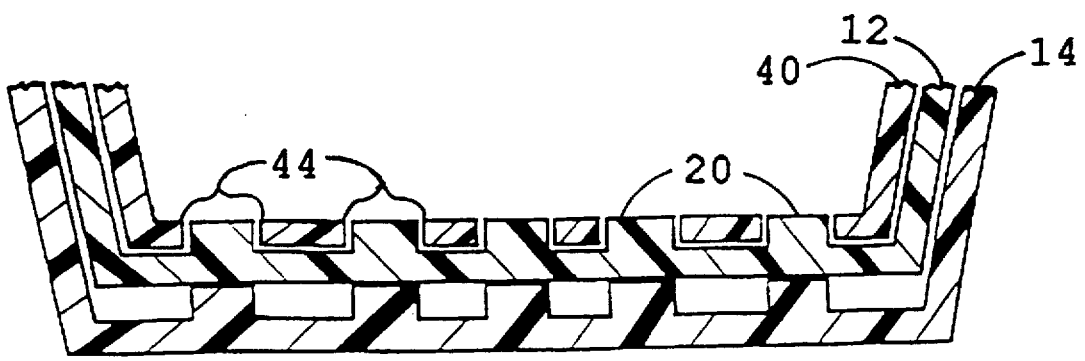
FIG. 3 shows an exploded cross-sectional view illustrating the engagement of the projections of the receiving pan, with the perforations of the sifting tray.

A third nestable receptacle 40, has a perforated bottom portion 42, the perforations 44, are arranged to interengage the projections 20 or 22, of the receiving pan 12 or 14, in which it is selectively nested, thus filling the cavities otherwise created if projections 20 or 22, did not exist, as is shown in FIG. 3. The third receptacle 40, serves as the sifting tray for separating the pet waste from the clumping litter material. The vertical wall portion 46, of the sifting tray 40, is slightly greater in height than the vertical wall portion 24 and 26, of the receiving pans 12 and 14, and has an integrally formed rim 48, with integrally formed handles 50, which mutually oppose each other for ease of gripping the sifting tray 40, when lifting it out of either of the receiving pans 12 or 14, during the sifting procedure. Said handles 50, are on dead center of the length of the vertical wall portion 46, so that when the sifting tray 40, is nestably placed inside either receiving pan 12 or 14, half of the handle 50, is unobstructed by the handle 32, of the receiving pan 12, in which it is placed, thus providing space to grip the handle 50, of the sifting tray 40.

The fourth component 52, is a removable spill rim for retaining litter material which may otherwise be thrown out during digging and/or covering by the pet. The spill rim 52, has a vertical wall portion 54, which has a disposal door 56, with a locking apparatus 58, which engages the upper edge 60, of the vertical wall portion 54. When locked in this open position, the disposal door serves to guide the pet waste into the trash receptacle or water toilet into which it is being discarded, and prevents any pet waste or litter material from being spilled onto the floor. The disposal door 56, has a second locking apparatus 62, to engage the rim 48, of the sifting tray 40, to hold it closed during pet use. The side opposing 64, the locking apparatus 62, of the disposal door 56, is hinged to allow opening and closing the disposal door. The spill rim 52, also has an integrally formed lip rim 66, which lockingly engages the rim 48, of the sifting tray 40, to hold it in place during pet use and during the disposal of pet waste. The integrally formed lip rim 66, also has an integrally formed notch 68, to allow space for the handles 50, of the sifting tray 40, and/or the handles 32 or 34, of the receiving pans 12 or 14, so that when the clean litter material is reintroduced to the second receiving pan which now contains the sifting tray 40, after the pet waste has been discarded, the disposal door can alternately be used to guide the clean litter material into the receptacle. Further, the lip rim 66, of the spill rim 52, is of minimal height, so that when it is lockingly engaged with the rim 48, of the sifting tray 40, it does not engage or obstruct the rim 28 or 30, of the receiving pan 12 or 14, whichever one the sifting tray 40, is selectively placed. The spill rim 52, is open 70, to the litter material contained in the sifting tray 40, below.

Figure 2:
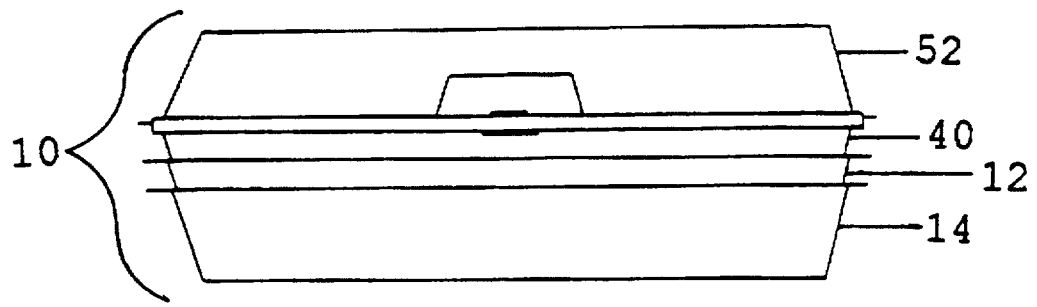
FIG. 2 shows a side view of the preferred embodiment of the invention with all components in a nestably stacked position.

In FIG. 2, a side view of the invention 10, is shown with the receiving pans, 12 and 14, the sifting tray 40, and the spill rim 52, nestably stacked, and engaged. The combined vertical height of the componants is substantially low to allow easy access for the pet. In some cases, such as small kittens, the use of the spill rim may impede the entry of the pet, in which case the spill rim may be removed, and then replaced during disposal of pet waste for use of the disposal door.

Figure 4:
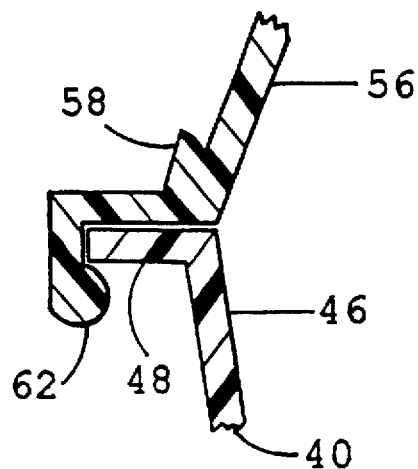
FIG. 4 shows an exploded cross-sectional view of the disposal door with the apparatus which lockingly engages the lip rim of the sifting tray, and the apparatus which lockingly engages the top edge of the spill rim to hold the disposal door in an open position during disposal of waste.

FIG. 4 is an exploded cross-sectional view of the disposal door, 56, which illustrates the locking apparatus 62, engaging the rim 48, of the sifting tray 40. The locking apparatus 62, holds the disposal door closed during pet use to prevent litter material from being thrown out during digging and/or covering by the pet. This same type of locking apparatus is used on portions of the lip rim 66, of the spill rim 52, to hold it in place during disposal of pet waste, but is not separately illustrated.

Figure 5:
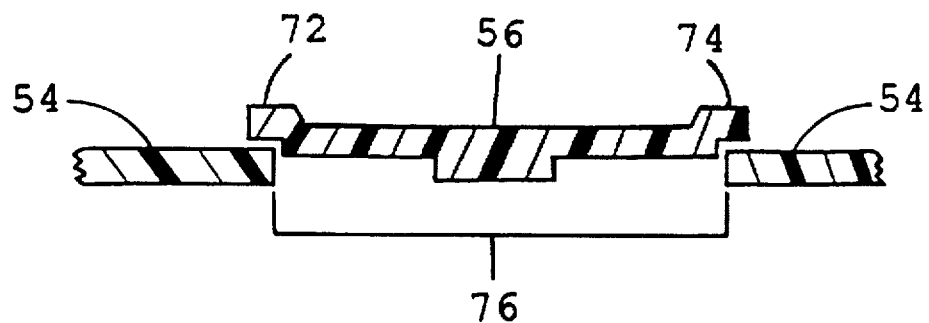
FIG. 5 shows an exploded bottom view of the disposal door in its closed position and illustrates the the engagement with the annular wall portion of the spill rim.

FIG. 5 is an exploded bottom view of the section of the vertical wall portion 54, of the spill rim 52, which is engaged by the the disposal door 56. It illustrates an overlap 72 and 74, on each side of the opening 76, in the vertical wall portion 54, of the spill rim 52.

To use the invention, a clumping litter material is poured into the sifting tray 40, which is nestably placed inside the receiving pan 12, which is placed inside the second receiving pan 14, and the spill rim 40, is then lockingly engaged on top of the sifting tray. After one day of pet use, the the empty receiving pan 14, which is stored under the first receiving pan 12, is removed and placed next to the remaining components of the unit. The sifting tray 40, with the spill rim 52, still engaged, is then lifted two or three inches above the first receiving pan 12, to to allow the clean litter material to sift through the openings 44, into the receiving pan 12, while trapping both solid and clumped liquid pet waste in the sifting tray 40, for disposal. Immediately following separation, the sifting tray 40, is then placed into the empty receiving pan 14, to prevent any spilling through the openings 44, of the sifting tray 40. The disposal door 56, is then lifted open 180 degrees and locked onto the upper edge of the spill rim itself to create a somewhat small opening in the vertical wall portion 54, of the spill rim 52. The pet waste is then discarded into a waste receptacle of choice, and the disposal door closed and locked in its original position. Upon the removal of all pet waste and contaminated litter contained in the sifting tray 40, and second receiving pan 14, the clean litter material is then poured from the first receiving pan 12, into the second receiving pan 14, which now contains the sifting tray 40. Once all clean litter has been transferred, the empty receiving pan 12, is then stored under the the other receiving pan 14, until next use.

Figure 6:
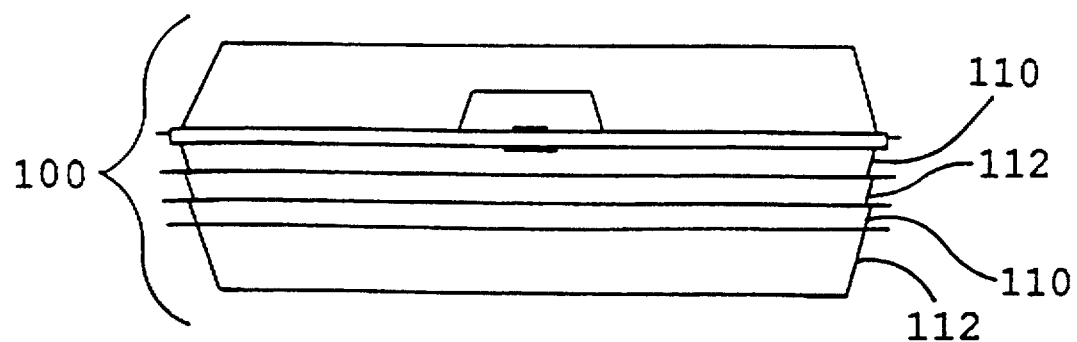
FIG. 6 shows a side elevation of an alternative embodiment.

FIG. 6 is a side view of an alternative embodiment of the invention. In this embodiment the invention, indicated by the number 100, has a plurality of sifting trays 110, having perforations for separating waste from litter material, and are nestably placed inside a plurality of receiving pans 112, having a ribbed, solid bottom portion. In use, the sifting tray is removed, the clean litter poured into the second receiving pan which contains the second sifting tray. Then the first sifting tray is replaced into the first receiving pan, which are then stored under the second sifting tray and receiving pan until next use.

As demonstrated by the alternative embodiment, changes and/or additions could be made to the preferred embodiment which would remain within the scope of the invention disclosed herein. The intent of this disclosure is merely for illustration and not as a limitation, therefore, the invention should be accorded the full scope of the claims.

What is claimed:

1. An odor free litter system for collecting, separating, and disposing of solid and clumped liquid pet waste while retaining the usable portion of the litter material comprising:

a first open top litter receptacle having an annular wall portion with an integrally formed handle means for lifting and gripping receptacle, and a solid bottom portion, the bottom portion having a plurality of raised projections formed thereon;

a substantially identical second open top litter receptacle having an annular wall portion with an integrally formed handle means for gripping and lifting receptacle, and a solid bottom portion, the bottom portion having a plurality of raised projections formed thereon, said first and second litter receptacles being interchangeable in a nestably stacked relationship;

an open top sifting receptacle having an annular side wall portion with an integrally formed handle means for lifting and gripping receptacle, and a bottom portion having a plurality of perforations through which clean, clumping type litter material may pass, said perforations being sufficiently small to block the passage of solid and clumped liquid pet waste therethrough, said sifting receptacle having a shape and dimensions substantially identical to said litter receptacles so that the sifting receptacle can be received by said litter receptacles in a nestably stacked relationship, said perforations being arranged such that they are interengagable with raised projections in an upper selected one of the stacked litter receptacles, whereby the projections fill the cavities which would otherwise be created by the perforations, and would otherwise be filled by litter material and then become clogged when litter material is wetted and agglomerates; whereby the sifting receptacle is lifted from said stacked litter receptacles and clean clumping type litter material is sifted through perforations into upper one of the stacked litter receptacles to separate waste from clean litter, said waste being disposed of from the sifting receptacle, and clean litter being reintroduced from upper litter receptacle into the sifting receptacle with other litter receptacle stacked below sifting receptacle so that clean litter can be reused.

2. The system of claim 1 further comprising a removable spill rim to prevent litter material from being thrown out during digging or covering by the pet, having an annular wall portion and an open top and bottom, with an integrally formed lip rim extending horizontally outwardly from the annular wall portion and vertically downward to engage an uppermost one of said stacked receptacles, the vertical portion of the integrally formed lip rim having an integrally formed notch to receive the handles of the uppermost receptacle; and a disposal door formed in the annular wall portion having a hinge means for permitting disposal door to be selectively opened and closed with a first and second locking means for holding disposal door in a selected open or closed position, respectively.

3. The system of claim 2 in which said removable spill rim and said receptacles include complementary means for lockingly interengaging spill rim to said receptacles.

\* \* \* \* \*